(12) United States Patent
Chen et al.

(10) Patent No.: US 9,077,747 B1
(45) Date of Patent: Jul. 7, 2015

(54) SYSTEMS AND METHODS FOR RESPONDING TO SECURITY BREACHES

(71) Applicant: Symantec Corporation, Mountain View, CA (US)

(72) Inventors: Joseph Chen, Los Angeles, CA (US); Kamron Farrokh, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 38 days.

(21) Appl. No.: 13/949,222

(22) Filed: Jul. 23, 2013

(51) Int. Cl.
*H04L 29/06* (2006.01)

(52) U.S. Cl.
CPC .................................. *H04L 63/1441* (2013.01)

(58) Field of Classification Search
CPC ......................... H04L 63/1441; H04L 63/0815
USPC ...................................................... 726/23, 8
See application file for complete search history.

(56) References Cited

U.S. PATENT DOCUMENTS

| | | | |
|---|---|---|---|
| 8,250,095 B2 * | 8/2012 | Wu et al. | 707/783 |
| 2008/0184349 A1 * | 7/2008 | Ting | 726/7 |
| 2011/0083181 A1 * | 4/2011 | Nazarov | 726/23 |

* cited by examiner

*Primary Examiner* — Mohammad L Rahman
(74) *Attorney, Agent, or Firm* — ALG Intellectual Property, LLC

(57) ABSTRACT

A computer-implemented method for responding to security breaches may include (1) receiving a notification that a service provider has experienced a security breach, (2) identifying a first user account that is potentially affected by the security breach by identifying an account management database that stores users' account information for a plurality of different service providers and searching the account management database for user accounts associated with the service provider that experienced the security breach, and (3) performing, for the first user account that is potentially affected by the security breach, a security action that addresses the security breach. Various other methods, systems, and computer-readable media are also disclosed.

20 Claims, 6 Drawing Sheets

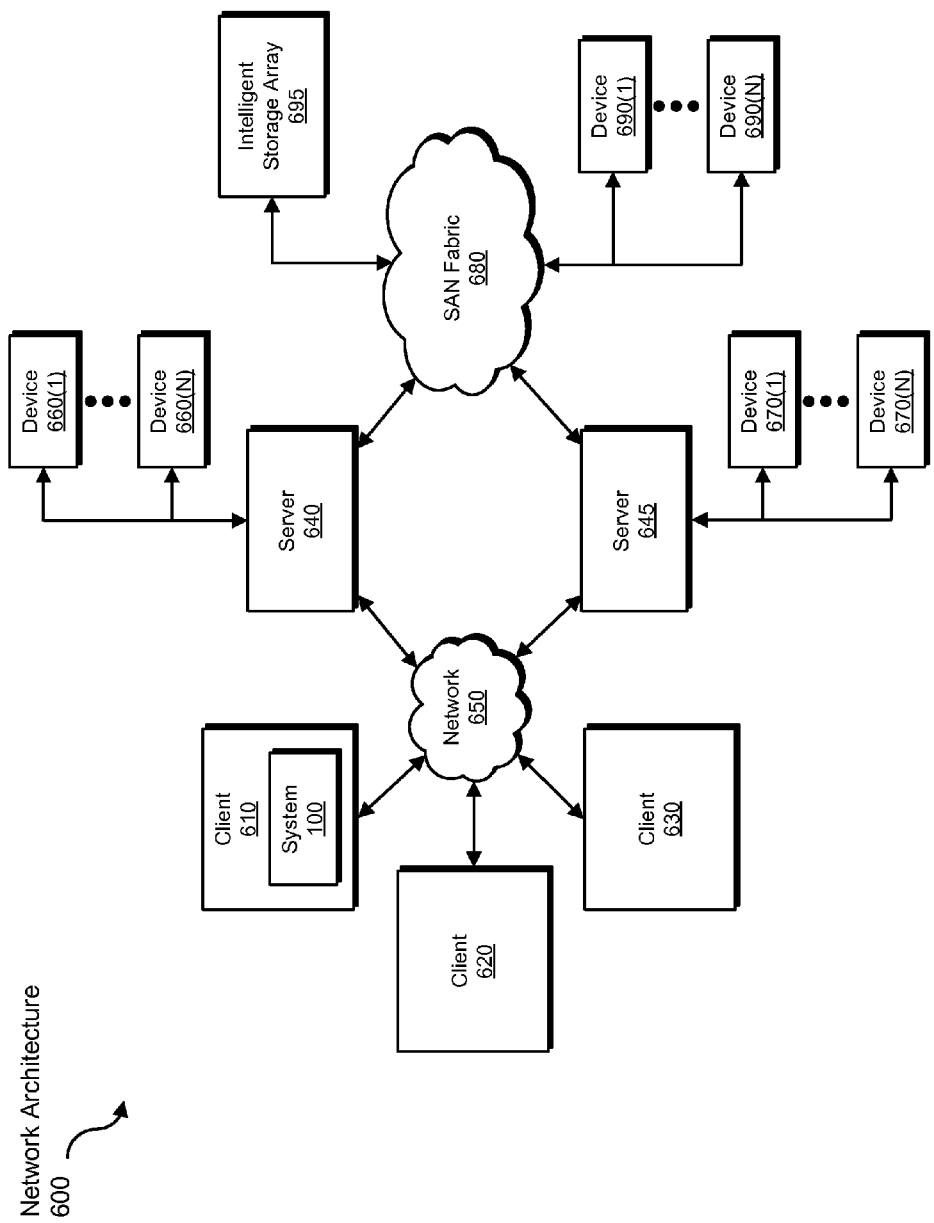

SYSTEMS AND METHODS FOR RESPONDING TO SECURITY BREACHES

BACKGROUND

As people increasingly use Internet accounts to connect with others, store data, and manage their personal and work lives, the risk of having sensitive information stolen from these accounts also increases. In the event of a security breach, an account provider may attempt to contact all users affected by the breach to warn them of the potential loss of sensitive information. Unfortunately, some affected users may not receive such warnings. Furthermore, even if a user receives a warning about a security breach, the user may not respond to the warning in a manner that adequately protects the user's sensitive information.

An additional issue related to security breaches is that many people use the same username and password for most, if not all, of their Internet accounts. For such users, if account credentials of one account are compromised, the security of any other accounts that use the same credentials may also be compromised. Thus, even if a user receives a warning from an account provider about a potential security breach, the user may not realize that the security breach may compromise the security of other accounts.

Accordingly, the instant disclosure identifies and addresses a need for additional and improved systems and methods for responding to security breaches.

SUMMARY

As will be described in greater detail below, the instant disclosure generally relates to systems and methods for responding to security breaches. For example, a method for responding to security breaches may include (1) receiving a notification that a service provider has experienced a security breach, (2) identifying a first user account that is potentially affected by the security breach by identifying an account management database that stores users' account information for a plurality of different service providers and searching the account management database for user accounts associated with the service provider that experienced the security breach, and (3) performing, for the first user account that is potentially affected by the security breach, a security action that addresses the security breach.

The method may also include (1) identifying a user associated with the first user account, (2) searching the account management database for additional accounts associated with the user, (3) while searching the account management database, identifying a second user account associated with the user, and (4) performing, for the second user account, an additional security action that addresses the security breach. In such embodiments, the method may further include (1) identifying account-access information used to access the first user account, (2) identifying account-access information used to access the second user account, (3) identifying one or more similarities between the account-access information of the first user account and the account-access information of the second user account by comparing the account-access information of the first user account with the account-access information of the second user account, and (4) determining, based on the one or more similarities between the account-access information of the first and second user accounts, that the second user account is potentially at risk as a result of the potential exposure of the account-access information of the user first user account (the security action is performed in response to the determination that the second user account is potentially at risk).

In some embodiments, the account-access information of the first user account may include a first username and a first password, the account-access information of the second user account may include a second username and a second password, and identifying the one or more similarities may include determining that the first username is the same as the second username and that the first password is the same as the second password. In one example, the first password may be stored in the account management database as a first fingerprint of an unencrypted version of the first password and the second password may be stored in the account management database as a second fingerprint of an unencrypted version of the second password. In such embodiments, determining that the first password is the same as the second password may include comparing the first fingerprint with the second fingerprint.

In some embodiments, performing the additional security action for the second user account may include notifying the user that the second user account is potentially at risk as a result of the security breach. Additionally or alternatively, performing the additional security action may include automatically changing, in response to identifying the first user account as being potentially affected by the security breach, a credential used to access the second user account.

As noted, the method may include receiving a notification that the service provider has experienced a security breach. Receiving the notification about the security breach may include discovering loss of sensitive data stored by the service provider. Additionally or alternatively, receiving the notification about the security breach may include receiving a notification from the service provider.

In some embodiments, the method may include maintaining the account management database by, for each user in a plurality of users, (1) receiving, from the user, user account information for multiple service providers, and (2) storing the user account information and associating the user account information with the user.

In one embodiment, a system for implementing the above-described method may include a breach-detection module programmed to receive notifications that a service provider has experienced a security breach. The system may also include an account-identification module programmed to identify a first user account that is potentially affected by the security breach by identifying an account management database that stores users' account information for a plurality of different service providers and searching the account management database for user accounts associated with the service provider that experienced the security breach. The system may further include a security module programmed to perform, for the first user account that is potentially affected by the security breach, a security action that addresses the security breach.

In some examples, the above-described method may be encoded as computer-readable instructions on a computer-readable-storage medium. For example, a non-transitory computer-readable medium may include one or more computer-executable instructions that, when executed by at least one processor of a computing device, may cause the computing device to (1) receive a notification that a service provider has experienced a security breach, (2) identify a first user account that is potentially affected by the security breach by identifying an account management database that stores users' account information for a plurality of different service providers and searching the account management database for user accounts associated with the service provider that experienced the security breach, and (3) perform, for the first user account that is potentially affected by the security breach, a security action that addresses the security breach.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary network architecture capable of implementing one or more of the embodiments described and/or illustrated herein.

Figure 1:
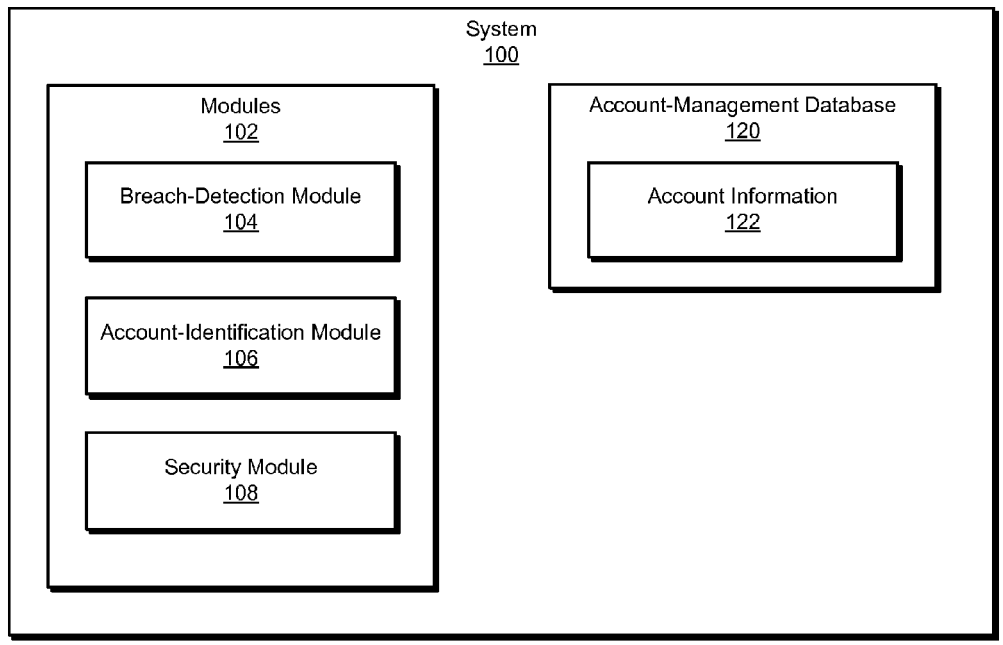
FIG. 1 is a block diagram of an exemplary system for responding to security breaches.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for responding to security breaches. As will be explained in greater detail below, these systems and methods may leverage stored account information (e.g., information stored in an account credentials database) to determine which accounts and users may be affected by security breaches. The systems and methods described herein may then notify affected users and/or perform other security actions on affected accounts. Embodiments of the instant disclosure may also provide efficient and effective security for users who use the same account credentials for multiple accounts, as discussed in greater detail below.

Figure 2:
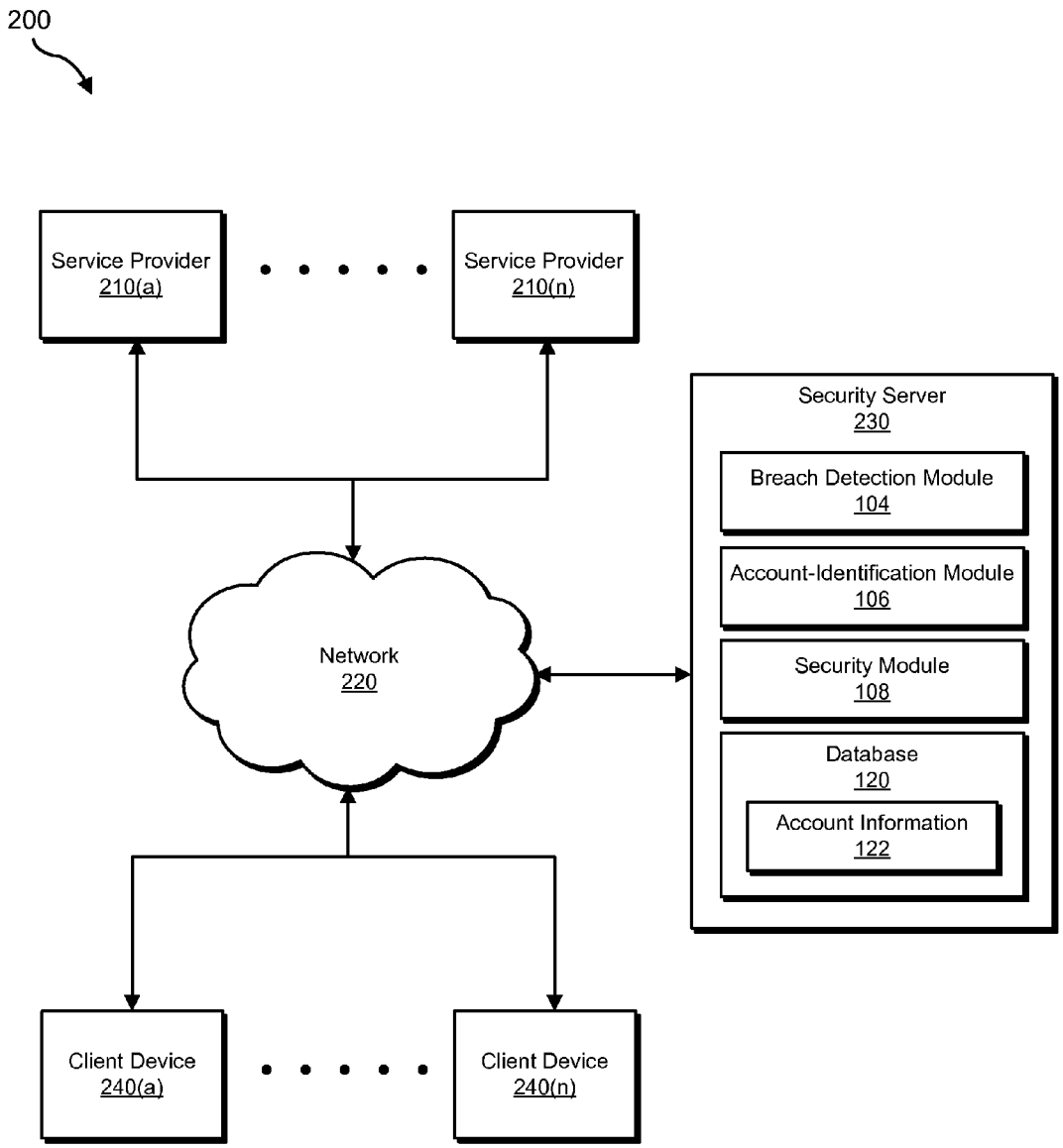
FIG. 2 is a block diagram of another exemplary system for responding to security breaches.

The following will provide, with reference to FIGS. 1-2, detailed descriptions of exemplary systems for responding to security breaches. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for responding to security breaches. As illustrated in this figure, exemplary system 100 may include one or more modules 102 for performing one or more tasks. For example, and as will be explained in greater detail below, exemplary system 100 may include a breach-detection module 104 that receives notifications that a service provider has experienced a security breach. Exemplary system 100 may also include an account-identification module 106 that identifies a first user account that is potentially affected by the security breach by identifying an account management database that stores users' account information for a plurality of different service providers and searching the account management database for user accounts associated with the service provider that experienced the security breach.

In addition, and as will be described in greater detail below, exemplary system 100 may include a security module 108 that performs, for the first user account that is potentially affected by the security breach, a security action that addresses the security breach. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., security server 230), and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as account-management database 120. In one example, account-management database 120 may be configured to store users' account information 122 for a plurality of different service providers. For example, account-management database 120 may store credentials (e.g., a username and password) for each of a user's online accounts (e.g., social networking accounts, banking accounts, email accounts, etc.).

Account-management database 120 may represent portions of a single database or computing device or a plurality of databases or computing devices. For example, account-management database 120 may represent a portion of security server 230 in FIG. 2, computing system 510 in FIG. 5, and/or portions of exemplary network architecture 600 in FIG. 6. Alternatively, account-management database 120 in FIG. 1 may represent one or more physically separate devices capable of being accessed by a computing device, such as security server 230 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include service providers 210(a)-(n) that provide accounts and other services to users of client devices 240(a)-(n) via network 220. FIG. 2 also shows a security server 230 that may communicate with client devices 240(a)-(n) and/or service providers 210(a)-(n) via network 220. Server 230 may be programmed with one or more of modules 102 and/or may store all or a portion of the data in account-management database 120.

In one embodiment, one or more of modules 102 from FIG. 1 may, when executed by at least one processor of security server 230, cause security server 230 to respond to security breaches. For example, and as will be described in greater detail below, one or more of modules 102 may cause security server 230 to receive a notification that service provider 210(a) has experienced a security breach and identify a first user account of service provider 210(a) that is potentially affected by the security breach. Security server 230 may identify the account affected by the breach by identifying account-management database 120 and searching account information 122 for user accounts associated with service provider 210(a). Security server 230 may then perform, for the first user account that is potentially affected by the security breach, a security action that addresses the security breach.

Client devices 240(a)-(n) generally represents any type or form of computing devices capable of reading computer-executable instructions. Examples may include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Service providers 210(a)-(n) broadly represent any entities and/or websites that provide network-based services. Examples of service providers may include, without limitation, social networking sites, online shopping sites, banking sites, online gaming networks, and/or educational institution sites.

Security server 230 generally represents any type or form of computing device that is capable of performing one or more security actions in response to security breaches. Examples of security server 230 include, without limitation, application servers and database servers configured to provide various database services and/or run certain software applications that implement the methods described herein.

Network 220 generally represents any medium or architecture capable of facilitating communication or data transfer. Examples of network 220 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 220 may facilitate communication or data transfer using wireless or wired connections. In one embodiment, network 220 may facilitate communication between service providers 210(a)-(n), security server 230, and client devices 240(a)-(n).

Figure 3:
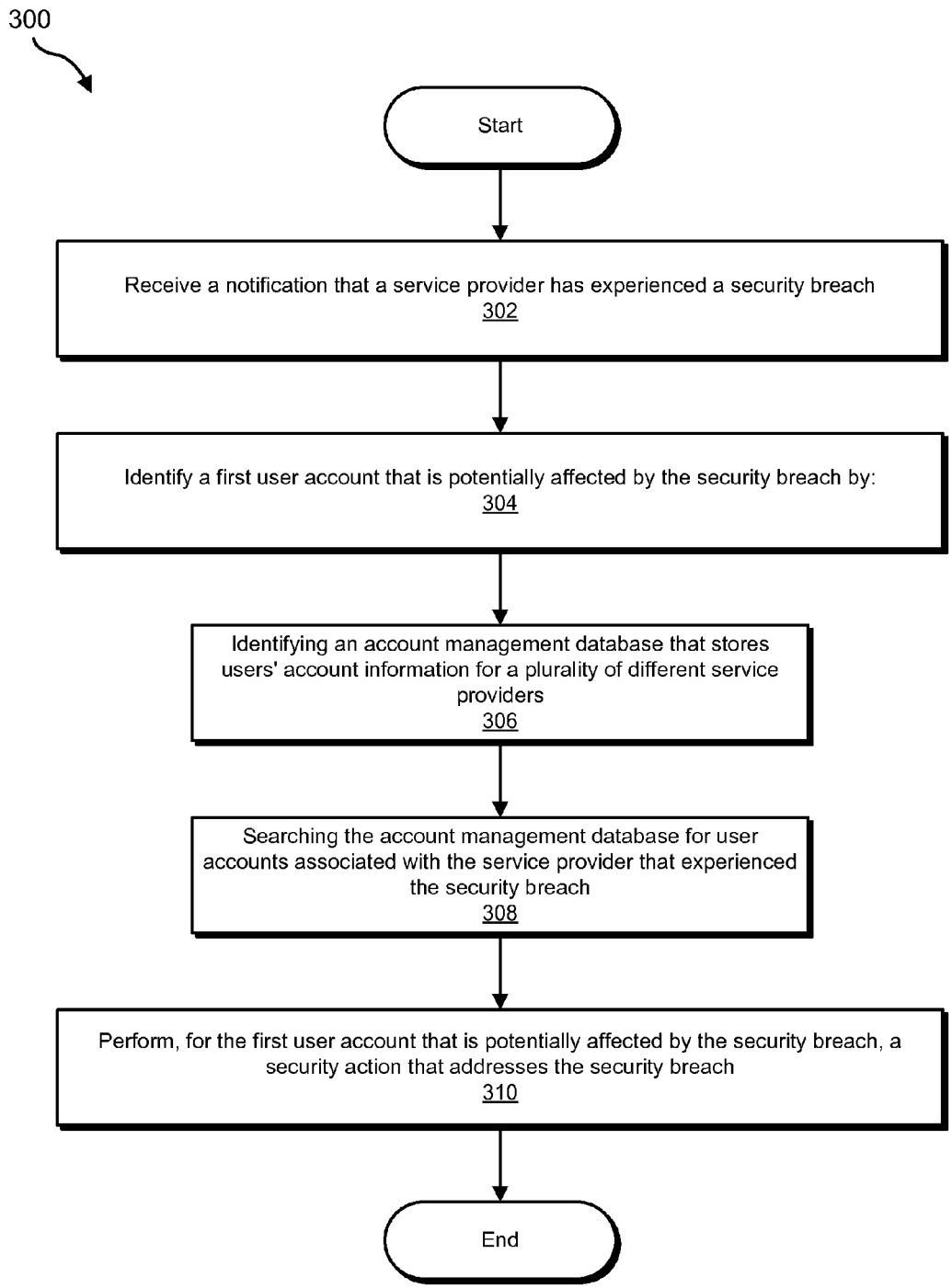
FIG. 3 is a flow diagram of an exemplary method for responding to security breaches.

FIG. 3 is a flow diagram of an exemplary computer-implemented method 300 for responding to security breaches. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive a notification that a service provider has experienced a security breach. For example, at step 302 breach-detection module 104 may, as part of security server 230 in FIG. 2, receive a notification that a service provider 210(a) has experienced a security breach that may put the information of its subscribers at risk.

Breach-detection module 104 may receive breach notifications from any suitable source in any suitable manner. For example, breach-detection module 104 may receive a notification that a service provider has experienced a breach by receiving an email, an alert, a public message board notification, user input, and/or any other type or form of electronic notification indicating that a security breach occurred. In some embodiments, breach-detection module 104 may receive the breach notification directly from the service provider. Additionally or alternatively, security server 230 may discover loss of sensitive data stored by the service provider (in such embodiments an entity that maintains security server 230 may provide security services for the service provider) and may provide breach-detection module 104 with the notification that the service provider has experienced the security breach.

As used herein, the phrase "security breach" generally refers to unintentional release or loss of secure data to an untrusted environment or entity. A security breach may involve a security incident where confidential information, sensitive information, or otherwise protected information is stolen, copied, viewed, transmitted, used, or otherwise accessed by an entity without authorization to do so. Security breaches may include unintentional disclosures, data leaks, data loss resulting from a malicious attack, and/or any other type or from of data release or loss. Security breaches may involve the release or loss of sensitive personal information (e.g., financial information, heath information, personally identifiable information, etc.), security credentials, sensitive corporate information (e.g., trade secrets, intellectual property, etc.), and/or any other type of secure or sensitive information.

At step 304, one or more of the systems described herein may identify a first user account that is potentially affected by the security breach. For example, at step 304 account-identification module 106 may, as part of security server 230 in FIG. 2, identify an account associated with service provider 210(a) that has experienced a security breach.

Account-identification module 106 may identify an account associated with a service provider that has experienced a security breach in any suitable manner. For example, as shown in FIG. 3, account-identification module 106 may identify an account-management database (e.g., account-management database 120) that stores users' account information (e.g., account information 122) for a plurality of different service providers (step 306). Account-identification module 106 may then search the account-management database (e.g., account-management database 120) for account information that is potentially at risk due to the security breach (step 308).

Account-identification module 106 may determine that an account is potentially at risk due to the account being associated with (e.g., provided by) a breached service provider. Alternatively, account-identification module 106 may determine that an account is potentially at risk by determining that the account is one of a subset of service provider accounts that were exposed in a security breach. As used herein, the phrase "potentially at risk" generally refers to an account whose information has been exposed, may be exposed, or likely has been exposed in a security breach.

Account-management database 120 may include any type or form of account-management system stored or maintained by a security provider. For example, account-management database 120 may include a credentials manager that saves usernames and/or passwords for online accounts, a confidential information manager that stores and protects sensitive information (e.g., credit card information, addresses, frequent flyer numbers, social security numbers, bank account numbers, birthdays, etc.) that may be associated with a user's accounts, and/or any other data structure or code for facilitating a user's access to online accounts.

In some embodiments, account-management database 120 may be maintained on and/or by security server 230, as shown in FIG. 2. In other words, a security provider that provides the security functions performed by modules 102 may also maintain account-management database 120. In such embodiments, security server 230 may receive, from each user who subscribes to an account management service, user account information for multiple service providers. Security server 230 may then store the user account information in account-management database 120 and associate the user account information with the user. Alternatively, account-management database 120 may be maintained by a third party service.

Account-management database 120 may store account information for any number of users and, for each user, may store information for any number of accounts. For example, one or more users may use account-management database 120 to store access credentials (e.g., usernames and passwords) for some or all of their banking accounts, social media accounts, email accounts, online shopping accounts, and/or other online accounts.

When a breach notification regarding a particular service provider is received, account-identification module 106 may search account-management database 120 for any user accounts associated with the service provider. In some embodiments, account-identification module 106 may parse or otherwise search through records stored in account-management database 120 to search for any account information that is tagged with, related to, or otherwise associated with the security provider that experienced the breach. For example, if the service provider "Generic Email Provider" experiences a security breach, account-identification module 106 may search account-management database 120 for any account information associated with the Generic Email Provider to identify user accounts associated with the Generic Email Provider.

At step 310, one or more of the systems described herein may perform, for the first user account that is potentially affected by the security breach, a security action that addresses the security breach. For example, security module 108 may, as part of security server 230 in FIG. 2, perform a security action for a user of client device 240(a) who has an account with service provider 210(a) (e.g., a service provide that may have experienced a breach).

Security module 108 may perform any type of security action in any suitable manner in response to determining that a user's account may potentially be affected by a security breach. For example, security module 108 may notify a user (e.g., by email, text message, phone, etc.) that an account the user has with the breached service provider may be potentially affected by a recent security breach of the service provider's data. Additionally or alternatively, security module 108 may lock the user's account, may change one or more credentials for the user's account, and/or may perform any other action to protect the user's account and/or account information.

Figure 4:
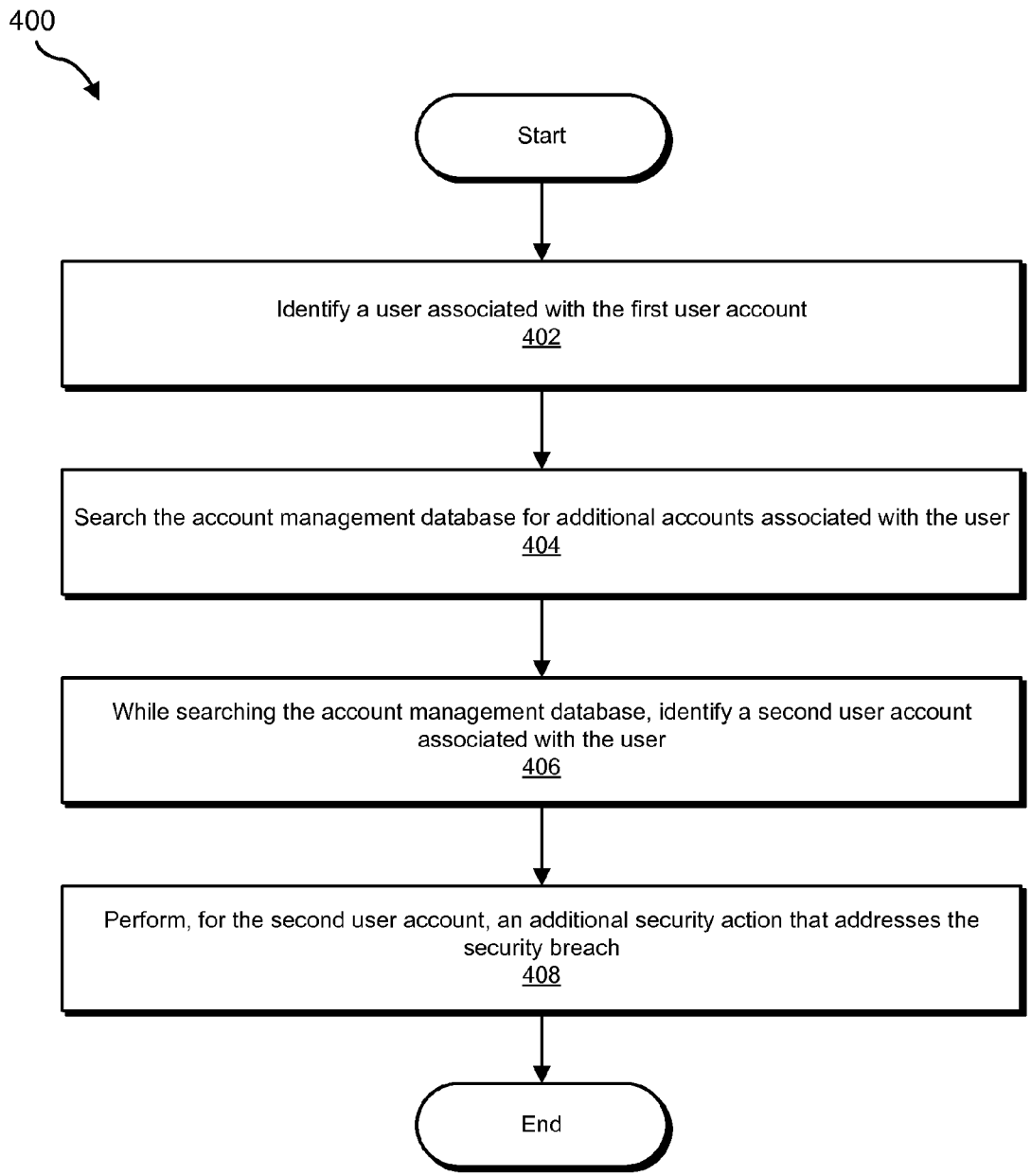
FIG. 4 is a flow diagram of another exemplary method for responding to security breaches.

In some embodiments, the systems and methods described herein may determine whether a potential security breach of account information for one account may affect one or more other accounts of a user. FIG. 4 is a flow diagram of an exemplary computer-implemented method 400 for identifying and protecting additional accounts that may be affected by a security breach of a first account. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 510 in FIG. 5, and/or portions of exemplary network architecture 600 in FIG. 6.

At step 402, one or more of the systems described herein may identify a user associated with a first user account that may be affected by a security breach (e.g., an account provided by a security provider that experienced a security breach). For example, account-identification module 106 may identify a user (e.g., a user of client device 240(a)) associated with an account provided by service provider 210(a) (e.g., a service provider who recently experienced a security breach).

Account-identification module 106 may identify a user associated with a potentially compromised account in any suitable manner. In some embodiments, when account-identification module 106 identifies the user account that is potentially affected by the security breach (see step 304 in FIG. 3), account-identification module 106 may also identify a user that owns the account that is potentially affected by the security breach. For example, if a user uses account-management database 120 to store credentials for multiple online services, and one of the online services experiences a security breach, account-identification module 106 may identify the user by determining that the user stores account information for the breached online service on account-management database 120.

After identifying the user whose first account is potentially affected by the security breach, one or more of the systems described herein may search an account management database for additional accounts associated with the user of the first account (step 404). For example, account-identification module 106 may search account-management database 120 for additional accounts associated with the user of the first account (e.g., the user of client device 240(a).

Account-identification module 106 may search account-management database 120 for additional accounts of a user in a variety of ways. For example, a user may subscribe to or maintain an account-management-service account (e.g., a password manager account) that stores account information for the user's online accounts on account-management database 120. In this example, account-identification module 106 may search for additional accounts of the user by identifying any or all accounts for which information is stored in the user's account-management-service account. Additionally or alternatively, account-identification module 106 may search account-management database 120 for any database records stored on behalf of the user. Account-identification module 106 may then identify online accounts that are associated with the database records (e.g., online accounts for which the database record stores account information, such as credentials, of the user).

While searching an account-management database for additional accounts associated with the user, the systems and methods described herein may identify a second user account associated with the user (step 406). For example, account-identification module 106 may, as part of security server 230 in FIG. 2, determine that a user of client device 240(a) has an account with service provider 210(n).

Account-identification module 106 may identify a second account associated with a user (e.g., a user whose account information for a first account may be compromised) in a variety of ways. For example, account-identification module 106 may identify account-access information used to access the first user account (i.e., the account that was potentially affected by a security breach at a service provider who provides the first account). Since the account-access information is for an account with a service provider that experienced a security breach, the account-access information potentially may have been exposed during the security breach.

In addition to identifying account-access information used to access the first user account, account-identification module 106 may identify account-access information used to access the second user account. Account-identification module 106 may then identify one or more similarities between the account-access information of the first user account and the account-access information of the second user account by comparing the account-access information of the first user account with the account-access information of the second user account. For example, account-identification module 106 may determine whether one or more credentials for the first user account is similar to or the same as one or more credentials for the second user account.

As used herein, the phrase "account-access information" generally refers to any type or form security key, credential, and/or other authentication information that may be required to access an online account. Account-access information may include passwords, user names, identity certificates, mutual authentication information (e.g., images, text, etc.), and/or any other information that may be used to authenticate a user.

After identifying the similarities between the account-access information for the first and second user accounts, account-identification module 106 may determine, based on the similarities between the account-access information of the first and second user accounts, that the second user account is potentially at risk as a result of the potential exposure of the account access information of the user first user account. For example, account-identification module 106 may determine that a username and/or password for the first account are the same as a username and/or password for the second account. Account-identification module 106 may determine that the second account is at risk because it can be accessed with the compromised credentials of the first account.

In additional embodiments, account-identification module 106 may determine that a credential of the first account is similar to, but not identical to, a credential of the second account. For example, account-identification module 106 may determine a distance between a password for the first user account and a password for the second user account. Account-identification module 106 may then determine that the distance is below a predetermined threshold and, as a result, the second user account is potentially at risk.

In some embodiments, the first password may be stored in account-management database 120 as a first fingerprint of an unencrypted version of the first password. Similarly, the second password may be stored in the account management database as a second fingerprint of an unencrypted version of the second password. In such embodiments, account-identification module 106 may determine that the first password is the same as the second password by comparing the first fingerprint with the second fingerprint and determining that the fingerprints are identical.

As used herein, the term "fingerprint" generally refers to any value returned by an algorithm or function that encodes data. Fingerprints may include hash values, hash sums, hash codes, checksums, and/or any other value returned by an encoding function (e.g., any fingerprinting algorithm, hash function, etc.). Thus, a fingerprint of an unencrypted version of a password may be an encoded version of the password. In some embodiments, fingerprints may be computed using a one-way hash function that may be easy to compute but difficult to invert. In addition to encoding passwords, usernames and/or other account information may also be encoded. Encoding account information before it is stored in account-management database 120 may help ensure the security of the account information.

Returning to FIG. 4, at step 408 one or more of the systems described herein may perform, for the second user account identified in step 406, an additional security action that addresses the security breach. For example, at step 408 security module 108 may, as part of security server 230 in FIG. 2, perform an additional security action. The additional security action may be performed in response to the determination that the second user account is potentially at risk.

Security module 108 may perform any type of security action in any suitable manner. For example, security module 108 may alert the user that the second account may be at risk as a result of the security breach in the first account. Additionally or alternatively, security module 108 may change a credential (e.g., username or password) used to access the second user account and may notify the user of the changed credential. In some embodiments, security module 108 may lock the second user account and/or perform any other security action to protect the second user account.

Steps 406 and 408 (identifying a second user account and performing an additional security action for the second user account) may be performed for any number of additional accounts associated with a user whose first account has been compromised by a security breach. In some embodiments, steps 406 and 408 may be performed for each account that is associated with the user.

The systems and methods discussed above may facilitate efficient and accurate identification of specific users and user accounts that may be affected by security breaches. Furthermore, the systems and methods presented herein may go through a user's stored usernames and passwords to figure out where a user has reused potentially compromised usernames and passwords. The embodiments of the instant disclosure may then alert a user with a list identifying each website where the user has reused a compromised username and password. As a result, the systems and methods described herein may prevent the weakest link (e.g., a service provider with weak security) from compromising many or all of a user's accounts.

Figure 5:
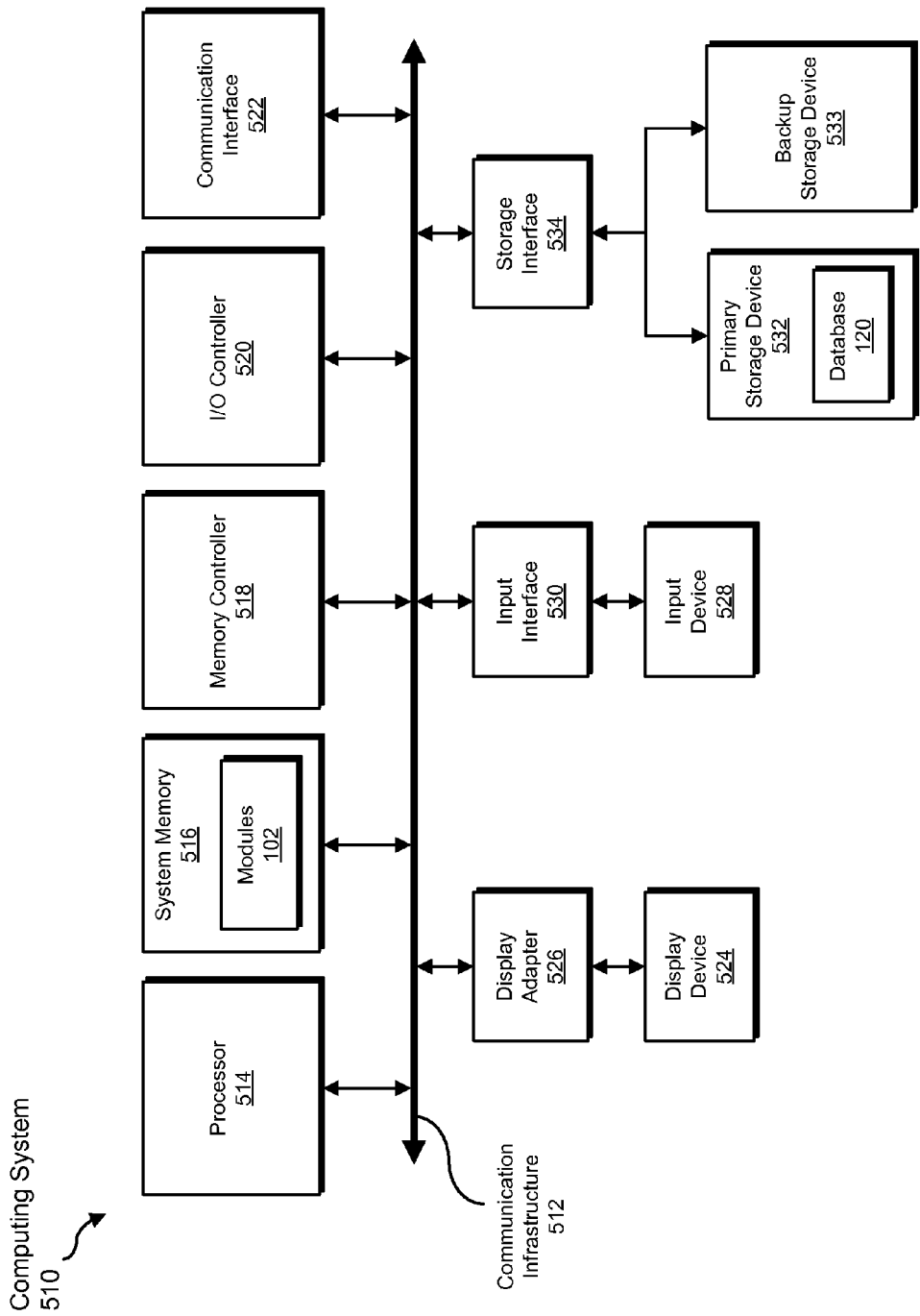
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, account-management database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and intelligent storage array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for responding to security breaches.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.)

may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a security system by encoding the computing system with instructions to receive and respond to security breach notifications. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for responding to security breaches, at least a portion of the method being performed by a computing device comprising at least one processor, the method comprising:
receiving, via a security server, a notification that a website that provides network-based services has experienced a security breach;
identifying, via the security server, a first user account that is potentially affected by the security breach by:
identifying an account management database that stores users' account information for a plurality of different websites that provide network-based services;
searching the account management database for user accounts associated with the website that experienced the security breach;
identifying an account-access credential used to access the first user account, wherein the account-access credential used to access the first user account was potentially exposed during the security breach;
identifying, via the security server, a second user account that is potentially at risk as a result of the potential exposure of the account-access credential used to access the first user account by:
identifying a user associated with the first user account;
searching the account management database for additional accounts associated with the user;
while searching the account management database, determining that the second user account is associated with the user;
identifying an account-access credential used to access the second user account;
determining that the account access credential used to access the first account is not identical to the account access credential used to access the second user account;
determining a distance between the account-access credential used to access the first user account and the account-access credential used to access the second user account;
determining that the distance is below a predetermined threshold;
determining, based on the determination that the distance is below the predetermined threshold, that the second user account is potentially at risk as a result of the potential exposure of the account-access credential used to access the first user account;
performing, via the security server, for the first user account that is potentially affected by the security breach, a security action that addresses the security breach;
performing, via the security server, for the second user account, an additional security action that addresses the security breach in response to determining that the second user account is potentially at risk.

2. The computer-implemented method of claim 1, wherein receiving the notification that the website that provides network-based services has experienced the security breach comprises receiving a public message board notification that the website that provides network-based services has experienced the security breach.

3. The computer-implemented method of claim 1, wherein receiving the notification comprises receiving a notification that the website that provides network-based services has experienced at least one of:
a loss of secure data to an untrusted environment;
an unintentional disclosure of secure data;
a loss of sensitive personal information to an untrusted environment;
a loss of sensitive corporate information to an untrusted environment.

4. The computer-implemented method of claim 1, wherein:
the account-access credential used to access the first user account comprises a first username and a first password;
the account-access credential used to access the second user account comprises a second username and a second password.

5. The computer-implemented method of claim 4, wherein:
the first password is stored in the account management database as a first fingerprint of an unencrypted version of the first password;
the second password is stored in the account management database as a second fingerprint of an unencrypted version of the second password.

6. The computer-implemented method of claim 1, wherein the additional security action comprises notifying the user that the second user account is potentially at risk as a result of the security breach.

7. The computer-implemented method of claim 1, wherein:
the additional security action comprises automatically, in response to identifying the first user account as being potentially affected by the security breach, changing the account-access credential used to access the second user account.

8. The computer-implemented method of claim 1, wherein receiving the notification that the website that provides network-based services has experienced the security breach comprises at least one of:
detecting the security breach by discovering loss of sensitive data stored by the website that provides network-based services;
receiving the notification from the website that provides network-based services.

9. The computer-implemented method of claim 1, further comprising maintaining the account management database by, for each user in a plurality of users:
receiving, from each user, user account information for multiple websites that provide network-based services;
storing the user account information of each user and associating the user account information of each user with each respective user.

10. A system for responding to security breaches, the system comprising:
a breach-detection module programmed to receive a notification that a website that provides network-based services has experienced a security breach;

an account-identification module programmed to identify a first user account that is potentially affected by the security breach by:
  identifying an account management database that stores users' account information for a plurality of different websites that provide network-based services;
  searching the account management database for user accounts associated with the website that experienced the security breach;
a security module programmed to:
  identify an account-access credential used to access the first user account, wherein the account-access credential used to access the first user account was potentially exposed during the security breach;
  identify a second user account that is potentially at risk as a result of the potential exposure of the account-access credential used to access the first user account by:
    identifying a user associated with the first user account;
    searching the account management database for additional accounts associated with the user;
    while searching the account management database, determining that the second user account is associated with the user;
    identifying an account-access credential used to access the second user account;
    determining that the account access credential used to access the first account is not identical to the account access credential used to access the second user account;
    determining a distance between the account-access credential used to access the first user account and the account-access credential used to access the second user account;
    determining that the distance is below a predetermined threshold;
    determining, based on the determination that the distance is below the predetermined threshold, that the second user account is potentially at risk as a result of the potential exposure of the account-access credential used to access the first user account;
  perform, for the first user account that is potentially affected by the security breach, a security action that addresses the security breach;
  perform for the second user account, an additional security action that addresses the security breach in response to determining that the second user account is potentially at risk;
at least one hardware processor that executes the breach-detection module, the account-identification module, and the security module.

11. The system of claim 10, wherein breach-detection module is programmed to receive the notification that the website that provides network-based services has experienced the security breach by receiving a public message board notification that the website that provides network-based services has experienced the security breach.

12. The system of claim 10, wherein the breach-detection module is programmed to receive the notification that the website that provides network-based services has experienced the security breach by receiving a notification that the website that provides network-based services has experienced at least one of:
  a loss of secure data to an untrusted environment;
  an unintentional disclosure of secure data;
  a loss of sensitive personal information to an untrusted environment;
  a loss of sensitive corporate information to an untrusted environment.

13. The system of claim 10, wherein:
  the account-access credential used to access the first user account comprises a first username and a first password;
  the account-access credential used to access the second user account comprises a second username and a second password.

14. The system of claim 13, wherein:
  the account-identification module is programmed to store the first password in the account management database as a first fingerprint of an unencrypted version of the first password;
  the account-identification module is programmed to store the second password in the account management database as a second fingerprint of an unencrypted version of the second password.

15. The system of claim 10, wherein the additional security action performed by the security module comprises notifying the user that the second user account is potentially at risk as a result of the security breach.

16. The system of claim 10, wherein:
  the security action performed by the security module comprises automatically, in response to the account-identification module identifying the first user account as being potentially affected by the security breach, changing the account-access credential used to access the second user account.

17. The system of claim 10, wherein the breach-detection module is programmed to receive the notification that the website that provides network-based services has experienced the security breach by performing at least one of:
  detecting the security breach by discovering loss of sensitive data stored by the website that provides network-based services;
  receiving the notification from the website that provides network-based services.

18. The system of claim 10, wherein the account-identification module maintains the account management database by, for each user in a plurality of users:
  receiving, from each user, user account information for multiple websites that provide network-based services;
  storing the user account information of each user and associating the user account information of each user with each respective user.

19. A non-transitory computer-readable medium comprising one or more computer-executable instructions that, when executed by at least one processor of a computing device, cause the computing device to:
  receive, via a security server, a notification that a website that provides network-based services has experienced a security breach;
  identify, via the security server, a first user account that is potentially affected by the security breach by:
    identifying an account management database that stores users' account information for a plurality of different websites that provide network-based services;
    searching the account management database for user accounts associated with the website that experienced the security breach;
  identify an account-access credential used to access the first user account, wherein the account-access credential used to access the first user account was potentially exposed during the security breach;

identify, via the security server, a second user account that is potentially at risk as a result of the potential exposure of the account-access credential used to access the first user account by:
- identifying a user associated with the first user account;
- searching the account management database for additional accounts associated with the user;
- while searching the account management database, determining that the second user account is associated with the user;
- identifying an account-access credential used to access the second user account;
- determining that the account access credential used to access the first account is not identical to the account access credential used to access the second user account;
- determining a distance between the account-access credential used to access the first user account and the account-access credential used to access the second user account;
- determining that the distance is below a predetermined threshold;
- determining, based on the determination that the distance is below the predetermined threshold, that the second user account is potentially at risk as a result of the potential exposure of the account-access credential used to access the first user account;

perform, via the security server, for the first user account that is potentially affected by the security breach, a security action that addresses the security breach;

perform, via the security server, for the second user account, an additional security action that addresses the security breach in response to determining that the second user account is potentially at risk.

20. The non-transitory computer-readable medium of claim 19, wherein:
- the account-access credential used to access the first user account comprises a first username and a first password;
- the account-access credential used to access the second user account comprises a second username and a second password.

* * * * *

UNITED STATES PATENT AND TRADEMARK OFFICE
CERTIFICATE OF CORRECTION

| | | |
|---|---|---|
| PATENT NO. | : 9,077,747 B1 | Page 1 of 1 |
| APPLICATION NO. | : 13/949222 | |
| DATED | : July 7, 2015 | |
| INVENTOR(S) | : Joseph Chen et al. | |

It is certified that error appears in the above-identified patent and that said Letters Patent is hereby corrected as shown below:

In The Claims

Claim 11, at column 19, line 53, should read:
The system of claim 10, wherein the breach-detection Signed and Sealed this
Ninth Day of February, 2016

Michelle K. Lee
*Director of the United States Patent and Trademark Office*